United States Patent Office.

IRA WOOD, OF WOODSTOCK, VERMONT.

Letters Patent No. 94,805, dated September 14, 1869.

IMPROVED COMPOSITION OF LIQUIDS FOR TANNING.

The Schedule referred to in these Letters Patent and making part of the same.

To all whom it may concern:

Be it known that I, IRA WOOD, of Woodstock, in the county of Windsor, and State of Vermont, have invented new and useful Improvements in the Composition of Liquids for Tanning Hides and Skins, of which the following is a full, clear, and exact description.

My invention consists, mainly, in the use, in the composition of liquids for tanning hides and skins, of the leaves of the trees of the different varieties of alder, sycamore, elm, basswood, chestnut, (including the chinkapin and horse-chesnut,) walnut, (including hickory, black-walnut, and butternut,) apple, peach, poplar, and birch, which I use separately, or combined with each other, one or more, or all in equal, or in any proportions; or of one, or more, or all of said kinds of leaves, combined with alum, Glauber's salts, and nitric or sulphuric acid, or combined with liquids extracted from the leaves of the oak, or maple, or willow, or beech tree, one, or more, or all of the last-named four trees, including all of the varieties of the same, in the manner hereinafter specified.

In making my improved tanning-liquids, I take of the leaves of the trees above specified, viz, alder, sycamore, elm, basswood, chestnut, walnut, apple, peach, and birch, separately or combined, one or more, with each other, and if more than one variety, mixed in such proportions as may be found best for the object to be attained, and place as many of them in a brass or copper vessel as can well be pressed down below the top. I then put on as much water as will cover them, and apply sufficient heat to cause the water to boil smartly for about one hour. I then strain off the liquid, and to about forty gallons of the same I add about eight pounds of ground alum, about six pounds of Glauber's salts, and about two pounds of nitric or sulphuric acid, and stir the same until well mixed. Twenty gallons, or thereabouts, of the decoction of the leaves may be used in this composition. But I have found in practice, that the best results will be effected with about forty gallons. This liquid should then be allowed to cool to about blood-heat, and the hides and skins, after having been prepared in the usual way, placed in the liquid, and thoroughly worked or handled for ten or twelve hours, or until well stained; after which they may remain at rest, adding, from time to time, more of the liquid from boiling the leaves, to strengthen the liquor during the process of tanning; but no more alum, salts, or acids need be added after the first. In this process the hides and skins should be heated as in the common method of tanning with bark-liquor.

The liquor extracted as above described, from the leaves above mentioned, including those of the oak, maple, willow, and beech trees, may be used separately, each variety by itself, or combined with the liquor extracted from one, or more, or all of the other varieties, and in combination with liquor extracted from hemlock or oak bark, or cutch, or other tanning-liquid used in the manufacture of leather.

My improved liquids, extracted from the leaves of the various trees above described, may also be used in finishing leather which has been tanned by any other liquids or other processes known to the trade.

Steam may be used for extracting the tanning-material from the leaves, in which case they may be boiled in a tub or vat made of wood or other non-corrosive substances.

The leaves used for making my improved tanning liquids may be gathered before or after they have ripened and fallen. Some varieties are better when they are gathered after they have fallen. But others, especially the butternut, black walnut, and oak, should be gathered before they have fallen.

In tanning hides and skins with my improved tanning liquids, the same rules may be observed as in tanning with common bark-liquor. And the strength of the liquid produced by boiling the leaves should, before adding the alum, salts, and acid, indicate about 10° of the barkometer, an instrument understood by all practical tanners.

The leather tanned by the use of the liquids hereinbefore described will be exceedingly tough and strong, and either very pliable, limber, and soft, or more firm and solid, according to the use for which it is intended, and the treatment which it has received.

My tanning-liquids, made of the leaves of the different varieties of trees hereinbefore specified, are a combination of, or addition to my improvements composed wholly or in part of extracts of the leaves of trees described in the specification annexed to Letters Patent granted to me, and dated August 18, 1868, numbered 81,237, and reissued October 6, 1868, numbered 3,157, to which Letters Patent I now refer for a particular description of the improved tanning-liquids therein set forth and claimed.

Having above described my said invention, and its mode of application,

What I claim, and desire to secure by Letters Patent, is—

1. A tanning-liquid made of the leaves of the trees of the different varieties of alder, sycamore, elm, basswood, chestnut, walnut, hickory, apple, peach, poplar, and birch, hereinbefore described, used separately, or combined one with another, or two, or more, or all, in equal or any proportions, for the purpose and in the manner above set forth.

2. A tanning-liquid made of the leaves of the different varieties of alder, sycamore, elm, basswood, chestnut, walnut, hickory, apple, peach, poplar, and birch trees, used separately, or two, or more, or all together, in combination with the leaves of the different varieties of oak, maple, willow, and beech trees, the leaves of the four last-mentioned varieties of trees being used separately, or two, or more, or all, in making the liquid, all the said varieties of leaves being mixed in equal or any proportions, for the purpose and in the manner above set forth.

3. A tanning-liquid made of the different varieties of the alder, sycamore, elm, basswood, chestnut, walnut, hickory, apple, peach, poplar, and birch trees, used separately, or two, or more, or all of them together, in combination with alum, Glauber's salts, and nitric or sulphuric acid, in about the proportions above specified, and for the purpose and in the manner above set forth.

4. A tanning-liquid made of the leaves of the different varieties of the alder, sycamore, elm, basswood, chestnut, walnut, hickory, apple, peach, poplar, birch, oak, maple, willow, and beech trees, in combination with alum, Glauber's salts, and nitric or sulphuric acid, in about the proportions above specified, and for the purpose and in the manner above set forth.

5. A tanning-liquid made of the leaves of the different varieties of the oak, maple, willow, beech, alder, sycamore, elm, basswood, chestnut, walnut, hickory, apple, peach, poplar, and birch trees, used separately, or two, or more, or all of them together, in combination with a liquid made of hemlock bark, or oak bark, or cutch, or other tanning-liquid used in the manufacture of leather, in equal or any proportions, for the purpose and in the manner above set forth.

6. The employment of my improved tanning-liquids, made of the leaves of the different varieties of the oak, maple, willow, beech, alder, sycamore, elm, basswood, chestnut, walnut, hickory, apple, peach, poplar, and birch trees, one, or more, or all together, in finishing leather tanned by the use of other liquids or processes.

IRA WOOD.

Witnesses:
M. HARVEY,
EDMUND BURKE.